(12) United States Patent
Shimizu

(10) Patent No.: US 7,274,376 B2
(45) Date of Patent: Sep. 25, 2007

(54) SPECIAL EFFECT DEVICE, ADDRESS SIGNAL GENERATING DEVICE, ADDRESS SIGNAL GENERATING METHOD AND ADDRESS SIGNAL GENERATING PROGRAM

(75) Inventor: Hideyuki Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 10/816,140

(22) Filed: Apr. 1, 2004

(65) Prior Publication Data

US 2004/0196406 A1 Oct. 7, 2004

(30) Foreign Application Priority Data

Apr. 4, 2003 (JP) ............................ P2003-102352

(51) Int. Cl.
*G09G 5/00* (2006.01)
(52) U.S. Cl. ...................... 345/619; 345/443; 348/578; 348/580; 348/594
(58) Field of Classification Search .................... None
See application file for complete search history.

(56) References Cited

U.S. PATENT DOCUMENTS 6,091,423 A * 7/2000 Shiraishi et al. ............ 345/619

FOREIGN PATENT DOCUMENTS

JP 10-145672 5/1998

OTHER PUBLICATIONS

Multimedia Builder by Media Chance; http://mmb.mediachance.com/newfeatures/Effects/tweaks.htm Copyright year: 2000.*
http://web.archive.org/web/20000308043037/http://www.media.chance.com/mmbnews.htm.*
http://web.archive.org/web/20000303000430/www.mediachance.com/newfeatures/Effects/tweaks.htm.*

* cited by examiner

*Primary Examiner*—Mark Zimmerman
*Assistant Examiner*—Jwalant Amin
(74) *Attorney, Agent, or Firm*—Frommer Lawrence & Haug LLP; William S. Frommer; Thomas F. Presson

(57) ABSTRACT

A special effect device by which a new special picture effect is to be implemented in accordance with a read address control system. The device includes an address signal generating unit which generates a readout address signal for picture signals stored in a frame buffer so tat the picture signals stored in the frame buffer will be output to each of a plurality of corresponding triangular areas of a preset size fractionated from the picture Signals stored in the frame buffer.

3 Claims, 12 Drawing Sheets

| PARAMETER NAME | MEANING | RANGE | DEFAULT |
|---|---|---|---|
| IMultipleX | NUMBER IN X -DIRECTION | 1to20 | 1 |
| IMultipleY | NUMBER IN Y -DIRECTION | 1to20 | 1 |

| PARAMETER NAME | MEANING | RANGE | DEFAULT |
|---|---|---|---|
| fixCenterX | CENTER OF ROTATION | -1.0to1.0 | 0.0 |
| fixCenterY | | -1.0to1.0 | 0.0 |
| fixRotate | QUANTITY OF ROTATION | -8.0to8.0 | 0.0 |

| PARAMETER NAME | MEANING | RANGE | DEFAULT |
|---|---|---|---|
| fixOffset1 | OFFSET TOWARDS LEFT (LOWER) | -8.0 to 8.0 | 0.0 |
| fixOffset2 | CENTER OFFSET | -8.0 to 8.0 | 0.0 |
| fixOffset3 | OFFSET TOWARDS RIGHT (UPPER) | -8.0 to 8.0 | 0.0 |
| fixBoundary1 | LEFT (LOWER) BOUNDARY POSITION | -1.0 to 1.0 | -0.33 |
| fixBoundary2 | RIGHT (UPPER) BOUNDARY POSITION | -1.0 to 1.0 | 0.33 |
| lSolotType | SPLITTING DIRECTION | Vertical Hrozintal | ○ |

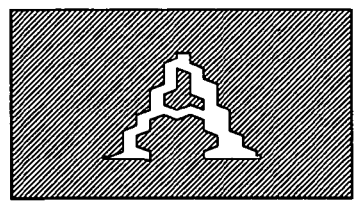
FIG.19
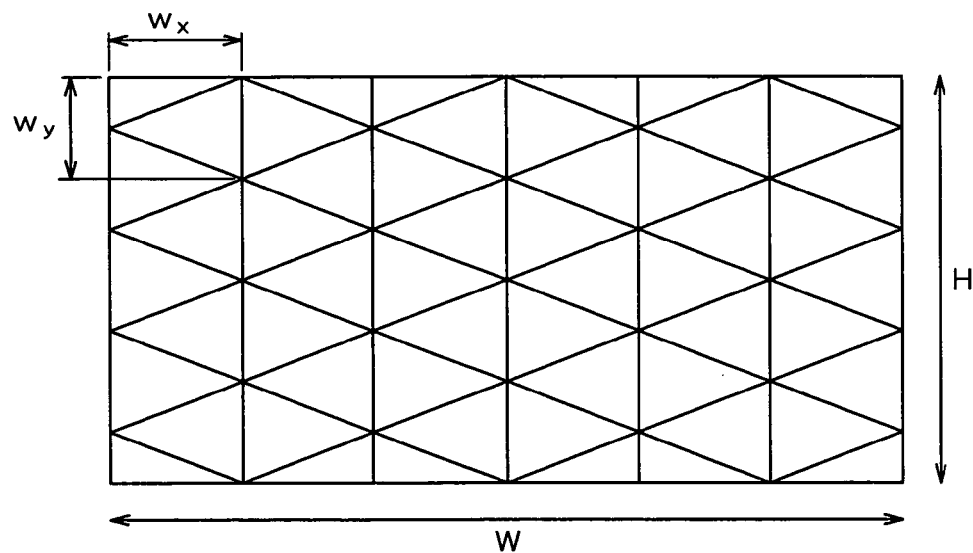
FIG.20
| PARAMETER NAME | MEANING | RANGE | DEFAULT |
|---|---|---|---|
| fixWidthX | WIDTH IN X -DIRECTION | 0.0 to 1.0 | 0.0 |
| fixWidthY | WIDTH IN Y -DIRECTION | 0.0 to 1.0 | 0.0 |
| fixCenterX | CENTER | -1.0 to 1.0 | 0.0 |
| fixCenterY | CENTER | -1.0 to 1.0 | 0.0 |
FIG.21

SPECIAL EFFECT DEVICE, ADDRESS SIGNAL GENERATING DEVICE, ADDRESS SIGNAL GENERATING METHOD AND ADDRESS SIGNAL GENERATING PROGRAM

BACKGROUND OF THE INVENTION

1. Field of the Invention

This invention relates to a special picture effect and, more particularly, to a special effect device for executing the special picture effect using a read address control system. This invention also relates to an address signal generating device, an address signal generating method and an address signal generating program.

This application claims priority of Japanese Patent Application No.2003-102352, filed in Japan on Apr. 4, 2003, the entirety of which is incorporated by reference herein.

2. Description of Related Art

A read address control system, in which a special picture effect is applied to picture signals stored in a frame memory by converting the readout address (address at the time of readout) and reading out the resulting address to apply a special picture effect to the picture signals, has been devised and put to practical use (see for example the Japanese Laying-Open Patent Publication H10-145672).

This read address control system has been devised and put to practical use only with respect to an extremely simple special picture effect, such as enlargement, contraction, rotation or displacement of pictures.

SUMMARY OF THE INVENTION

It is therefore an object of the present invention to provide a special effect device, an address signal generating device, an address signal generating method and an address signal generating program, which execute an entirely new special picture effect with the use of the aforementioned read address system.

In one aspect, the present invention provides a special effect device in which picture signals are read out from a frame buffer based on an address signal to impart a desired special effect to the picture signals read out from the frame buffer, the special effect device comprising address signal generating means for generating readout address signals of the picture signals stored in the frame buffer so that the picture signals stored in the frame buffer will be read out on a display picture surface as an array of m×n reduced-size pictures, where m and n denote natural numbers.

In another aspect, the present invention provides an address signal generating device for generating an address signal for reading out picture signals from a frame buffer, the address signal generating device including address signal generating means for generating a readout address signal of the picture signals stored in the frame buffer so that the picture signals will be read out from the frame buffer on a display picture surface as an array of m×n reduced-size pictures, where m and n denote natural numbers.

In a still another aspect, the present invention provides an address signal generating method for generating an address signal for reading out picture signals from a frame buffer, the address signal generating method including an address signal generating step of generating a readout address signal of the picture signals stored in the frame buffer so that the picture signals will be read out from the frame buffer on a display picture surface as an array of m×n reduced-size pictures, where m and n denote natural numbers.

In still another aspect, the present invention provides an address signal generating program for having a computer execute a process of generating an address signal for reading out picture signals from a frame buffer, the address signal generating program allowing a computer to execute an address signal generating step of generating readout address signals of the picture signals stored in the frame buffer so that the picture signals stored in the frame buffer will be read out on a display picture surface as an array of m×n reduced-size pictures, where m and n denote natural numbers.

In still another aspect, the present invention provides a special effect device in which picture signals are read out from a frame buffer based on an address signal to impart a desired special effect to the picture signals read out from the frame buffer, the special effect device comprising readout address signal generating means for generating readout address signals of the picture signals stored in the frame buffer so that the picture signals will be output from the frame buffer as a picture rotated a predetermined amount of rotation about an optional point, as set on the picture signals stored in the frame buffer, as the center of rotation.

In still another aspect, the present invention provides an address signal generating device for generating an address signal for reading out picture signals from a frame buffer, the address signal generating device comprising readout address signal generating means for generating readout address signals of the picture signals stored in the frame buffer so that the picture signals stored in the frame buffer will be output as a picture rotated a predetermined amount of rotation about an optional point, as set on the picture signals stored in the frame buffer, as the center of rotation.

In still another aspect, the present invention provides an address signal generating method for generating an address signal for reading out picture signals from a frame buffer, the address signal generating method comprising a readout address signal generating step of generating readout address signals of the picture signals stored in the frame buffer so that the picture signals will be output from the frame buffer as a picture rotated a predetermined amount of rotation about an optional point, as set on the picture signals stored in the frame buffer, as the center of rotation.

In still another aspect, the present invention provides an address signal generating program for having a computer execute a process of generating an address signal for reading out picture signals from a frame buffer, the address signal generating program allowing a computer to execute a readout address signal generating step of generating a readout address signal of the picture signals stored in the frame buffer so that the picture signals will be output from the frame buffer as a picture rotated a predetermined amount of rotation about an optional point, as set on the picture signals stored in the frame buffer, as the center of rotation.

In still another aspect, the present invention provides a special effect device in which picture signals are read out from a frame buffer based on an address signal to impart a desired special effect to the picture signals read out from the frame buffer, the special effect device comprising address signal generating means for generating a readout address signal of the picture signals stored in the frame buffer so that the picture signals will be output from the frame buffer with an offset movement of a predetermined amount in the vertical direction or in the horizontal direction and so that picture signals corresponding to a picture portion protruded to outside a display area during display as a result of the offset movement will be output in a void area formed on the opposite side to the direction of the offset movement.

In still another aspect, the present invention provides an address signal generating device for generating an address signal for reading out picture signals from a frame buffer, the address signal generating device comprising address signal generating means for generating a readout address signal of the picture signals stored in the frame buffer so that the picture signals stored in the frame buffer will be output with an offset movement of a predetermined amount in the vertical direction or in the horizontal direction and so that picture signals corresponding to a picture portion protruded to outside a display area during display as a result of the offset movement will be output in a void area formed on the opposite side to the direction of the offset movement.

In still another aspect, the present invention provides an address signal generating method for generating an address signal for reading out picture signals from a frame buffer, the address signal generating method comprising an address signal generating step of generating a readout address signal of the picture signals stored in the frame buffer so that the picture signals will be output from the frame buffer with an offset of a predetermined amount in the vertical direction or in the horizontal direction and so that picture signals corresponding to a picture portion protruded to outside a display area during display as a result of the offset movement will be output in a void area formed on the opposite side to the direction of the offset movement.

In still another aspect, the present invention provides an address signal generating program for having a computer execute a process for generating an address signal for reading out picture signals from a frame buffer, the address signal generating program allowing a computer to execute an address signal generating process for generating a readout address signal of the picture signals stored in the frame buffer so that the picture signals will be output from the frame buffer with an offset movement of a predetermined amount in the vertical direction or in the horizontal direction and so that picture signals corresponding to a picture portion protruded to outside a display area during display as a result of the offset movement will be output in a void area formed on the opposite side to the direction of the offset movement.

In still another aspect, the present invention provides a special effect device in which picture signals are read out from a frame buffer based on an address signal to impart a desired special effect to the picture signals read out from the frame buffer, the special effect device comprising address signal generating means for generating a readout address signal of the picture signals stored in the frame buffer so that the same picture signals will be output in each of a plurality of triangular areas of a preset size fractionated from the picture signals stored in the frame buffer.

In still another aspect, the present invention provides an address signal generating device for generating an address signal for reading out picture signals from a frame buffer, the address signal generating device comprising address signal generating means for generating a readout address signal of the picture signals stored in the frame buffer so that the same picture signals will be output in each of a plurality of triangular areas of a preset size fractionated from the picture signals stored in the frame buffer.

In still another aspect, the present invention provides an address signal generating method for generating an address signal for reading out picture signals from a frame buffer, the method address signal generating comprising an address signal generating step of generating a readout address signal of the picture signals stored in the frame buffer so that the same picture signals will be output in each of a plurality of triangular areas of a preset size fractionated from the picture signals stored in the frame buffer.

In yet another aspect, the present invention provides an address generating program for having a computer execute an address signal generating process of generating an address signal for reading out picture signals from a frame buffer, wherein the address generating program allows the computer to execute an address signal generating step of generating a readout address signal of the picture signals stored in the frame buffer so that the same picture signals will be output in each of a plurality of triangular areas of a preset size fractionated from the picture signals stored in the frame buffer.

According to the present invention, as described above, the readout address for picture signals stored in the frame buffer is generated by readout address generating means so that the picture signals are output from the frame buffer as an array of m×n reduced-size pictures on the display picture surface, where m and n are natural numbers, thus providing for an entirely new special picture effect.

According to the present invention, as described above, the readout address for picture signals stored in the frame buffer is generated by readout address generating means so that the picture signals are output as a picture rotated a predetermined amount of rotation about an optional point as set on the picture signals stored in the frame buffer, as the center of rotation, thus providing for an entirely new special picture effect.

According to the present invention, as described above, the readout address for picture signals stored in the frame buffer is generated by the readout address generating means so that the picture signals will be output from the frame buffer with an offset movement of a predetermined amount in the vertical direction or in the horizontal direction and so that picture signals corresponding to a picture portion protruded to outside a display area during display as a result of the offset movement will be output in a void area formed on the opposite side to the direction of the offset movement, thus providing for an entirely new special picture effect.

Moreover, according to the present invention, as described above, the readout address of the picture signals stored in the frame buffer is generated by the readout address generating means so that the same picture signals will be output in each of a plurality of triangular areas of a preset size fractionated from the picture signals stored in the frame buffer, thus providing for an entirely new special picture effect.

BRIEF DESCRIPTION OF THE DRAWINGS

FIG. 19 shows an example of a picture obtained on applying a triangular mosaic effect by the special picture effect device.

FIG. 20 shows the manner of splitting a picture area into triangular shape.

FIG. 21 shows parameters supplied to the read address generator 3 when executing the triangular mosaic effect.

DESCRIPTION OF PREFERRED EMBODIMENTS

Figure 1:
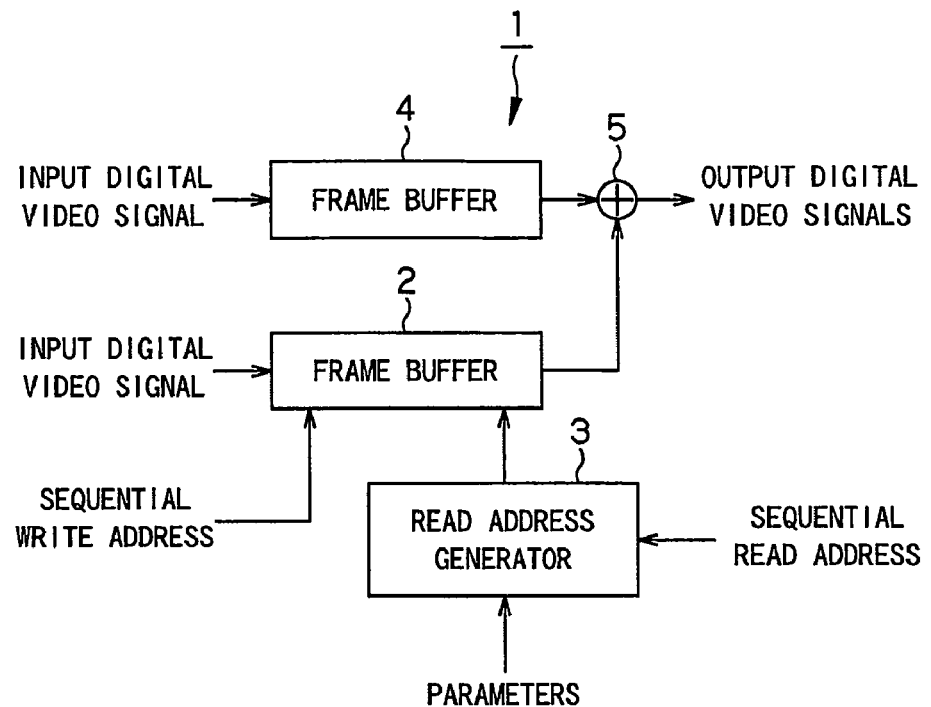
FIG. 1 illustrates the structure of a special picture effect device embodying the present invention.

Referring to the drawings, a special effect device, an address signal generating device, an address signal generating method and an address signal generating program are now explained in detail.

Referring first to FIG. 1, the structure of a special picture effect device, embodying the present invention, is explained. The special picture effect device 1 is a device supplied with digitized video signals to issue an output so that a preset special picture effect will be obtained. The special picture effect device 1 employs a read address control system as a system for applying the special picture effect to the input digital video signals. The read address control system is able to change the address which is valid in reading out pixel data making up a picture frame to achieve a variegated special picture effect. In the following description, the special picture effect is referred to simply as a special effect.

The special picture effect device 1, shown in FIG. 1, includes a frame buffer 2, a read address generator 3, a frame buffer 4 and a picture synthesizing unit 5.

The frame buffer 2 is a buffer memory for transient storage of the input digital video signals on the frame basis. The frame buffer 2 is able to store a plural number of frames, depending on the memory capacity. The digital video signals, supplied to the frame buffer 2, are given sequential write addresses (X, Y) indicating the positions on a frame as the two-dimensional space so as to be then stored in the frame buffer 2. That is, the digital video signals, supplied to the frame buffer 2, are stored as picture data in addresses (X, Y) in the memory space in the frame buffer 2.

Meanwhile, the write addresses (X, Y) are the same as the addresses (X, Y). That is, the write addresses (X, Y) are the addresses used in writing the digital video signals in the frame buffer 2 and become the addresses (X, Y) after having been written in the frame buffer 2. In the following description, it is assumed that frame-based picture data have already been stored in the frame buffer 2, and that the addresses in which are stored the picture data are the addresses (X, Y).

It is also assumed that the picture data stored in the frame buffer 2 has undergone the cropping processing of extracting picture data of an area which becomes valid in executing the special effect as later explained.

The read address generator 3 calculates the read addresses in reading out the picture data stored in the frame buffer 2, depending on the type of the special effect, in accordance with the read address control system employed in the special picture effect device 1. Using the so calculated read addresses, the read address generator 3 reads out the picture data stored in the frame buffer 2 to permit outputting of the picture to which the special effect has been applied.

Specifically, the read address generator 3 converts the sequential read addresses (x, y), used in reading out the picture data from the frame buffer 2, into the addresses (X, Y) of the picture data stored in the frame buffer 2, by calculations employing the parameters which differ with the type of the special effect. The read address generator 3 specifies the picture data, stored in the frame buffer 2, with the addresses (X, Y) converted from the sequential read addresses (x, y), to permit the picture data to be sequentially output in order to output the picture processed with the special effect.

Figure 2:
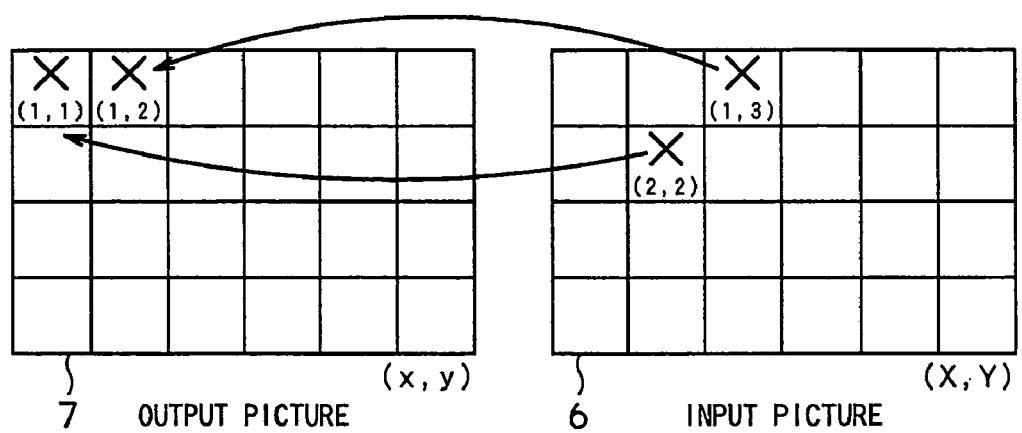
FIG. 2 shows a specified example for illustrating a read address control system as used in the special picture effect device.

For example, consider a picture frame 6 and a picture frame 7 shown in FIG. 2. The picture frame 6 is picture data stored in the frame buffer 2. The picture frame 7 is picture data read out from the frame buffer 2 such as to produce a special effect. That is, the picture frame 6 stored in the frame buffer 2 is read out with the address (X, Y) designated by the read address generator 3 to output the picture frame 7 to which the special effect has been applied.

In case the picture frame 6 and the picture frame 7 are each made up by picture data of (4×6) matrix, the picture frame 7 has the read addresses (x, y) sequentially designated in the horizontal scanning direction in a sequence of (1, 1) component, (1, 2) component and so forth. Responsive to this designation of the read addresses (x, y), the read address generator 3 determines the addresses (X, Y) of the picture frame 6 stored in the frame buffer 2, using the parameters which differ with the type of the special effect, in order to read out the picture data.

In FIG. 2, if, in order to form the picture frame 7, processed with the special effect, the read address (1, 1) is specified by the read address generator 3, the picture data stored in the address (2, 2) of the picture frame stored in the frame buffer 2 is read out. If the read address (1, 2) is specified, the picture data stored in the address (1, 3) of the picture frame is read out.

In this manner, the picture frame 6 stored in the frame buffer 2 is output as the picture frame 7, to which the special effect has been applied.

Thus, the special picture effect device 1, described above, is able to read out the picture data, stored in the frame buffer 2, with the address (X, Y) designated by the read address generator 3, to permit the outputting of a picture to which the special effect has been applied.

The detailed operation to be performed in the read address generator 3 will be explained later when the special effect is subsequently explained.

The special picture effect device 1 also includes the frame buffer 4 and the picture synthesizing unit 5. Similarly to the frame buffer 2, the frame buffer 4 is a buffer for transiently storing picture data on the frame basis. The picture data, stored in the frame buffer 4, is output as a picture not processed with the special effect, and is synthesized to an output picture from the frame buffer 2 by the picture synthesizing unit 5.

By providing the frame buffer 4 and the picture synthesizing unit 5, such outputting is possible in which, in case the output picture from the frame buffer 2, processed with the special effect, should disappear from the picture surface, an output picture from the frame buffer 4 appears on the background. An efficacious technique may be realized in case it is desirable to emphasize a scene change by the special effect.

There are plural special effects realized by the special picture effect device 1, as now explained in detail.

The special effects, that may be realized with the special picture effect device 1, may be enumerated by 1) a plural picture arraying effect, 2) an effect of rotation about an optional center of rotation, 3) an effect of fragmented tube-like rotation, and 4) a triangular mosaic effect. These special effects are now respectively explained.

1) Plural Picture Arraying Effect

Figures 3, 4, 5A, 5B:
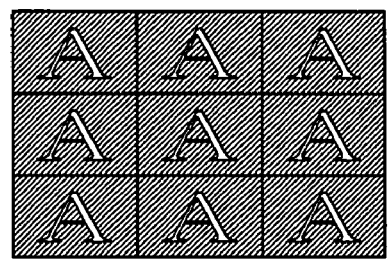
FIG. 3 shows an example of a picture obtained on applying a plural picture arraying effect by the special picture effect device.
FIG. 4 shows parameters supplied to a read address generator 3 in executing the plural picture arraying effect.
FIGS. 5a and 5b illustrate the plural picture arraying effect.

The plural picture arraying effect is the special effect of outputting several frame pictures on a sole picture surface. In FIG. 3, 3 by 3 pictures are output.

When the sequential read address (x, y) is designated for the read address generator 3, the address (X, Y) of picture data read out from the frame buffer 2 may be found by the function specified by the equation (1-1):

$$X=f_1(x)$$

$$Y=f_2(x) \quad (1\text{-}1).$$

Meanwhile, the functions $f_1(x)$ and $f_2(y)$ may be represented by the equations (1-2) and (1-3), respectively:

$$f_1(x)=x \times I\text{Multiple}X \ (mod\ W) \quad (1\text{-}2)$$

$$f_2(y)=y \times I\text{Multiple}Y \ (mod\ H) \quad (1\text{-}3)$$

where
W: (post-cropping) picture width
H: (post-cropping) picture height

W denotes the width of a picture to be actually processed with the special effect, and H denotes the height of the picture to be actually processed with the special effect. That is, W and H denote the width and the height following the cropping processing. The parameters IMultipleX and IMultipleY, used in the equations (1-2) and (1-3), are used for determining the numbers of divided pictures to be output, as shown in FIG. 4. According to FIG. 4, up to 20 by 20 at the maximum of the divided pictures may be output.

Referring to FIG. 5, showing a simpler case, the plural picture arraying effect, employing the equations (1-1), (1-2) and (1-3), is explained.

FIG. 5A shows a 3 by 4 picture frame, stored in the frame buffer 2. An upper case letter P is entered in each of the (1, 1) and (1, 2) components, whilst an upper case letter Q is entered in each of the (1, 3) and (1, 4) components.

In case the parameters IMultipleX and IMultipleY are such that IMultipleX=1, indicating that the number of divisions in the x-direction is 1, and IMultipleY=2, indicating that the number of divisions in the y-direction is 2, the read address generator 3 reads out the letters of the picture frame shown in FIG. 5A in the following manner.

First, when (x, y)=(1, 1) is entered, as a sequential address (x, y), to the read address generator 3, X=1×1=1, Y=1×2, from the equations (1-1), (1-2) and (1-3), so that the address (X, Y)=(1, 2) is obtained.

From FIG. 5A, (X, Y)=(1, 2) denotes an upper case letter P, so that the letter P is output.

In a similar manner, the read address generator 3 makes calculations for (x, y)=(1, 2), (1, 3) and (1, 4) to find the values of the address (X, Y)=(1, 4), (1, 6) and (1, 8). Although (X, Y)=(1, 4) is a letter Q, there are no addresses of (X, Y)=(1, 6) or (X, Y)=(1, 8). So, the read address generator 3 reverts to the start point to read out the letters P and Q of the addresses (X, Y)=(1, 2), (1, 4), respectively. This means modH, that is, modulo is taken of H and the y-component is divided by H to give a remainder which is used for classification.

In this manner, the values sequentially read out by the read address generator 3 are as shown in FIG. 5B, thus indicating division into two in the y-direction.

Figure 6:
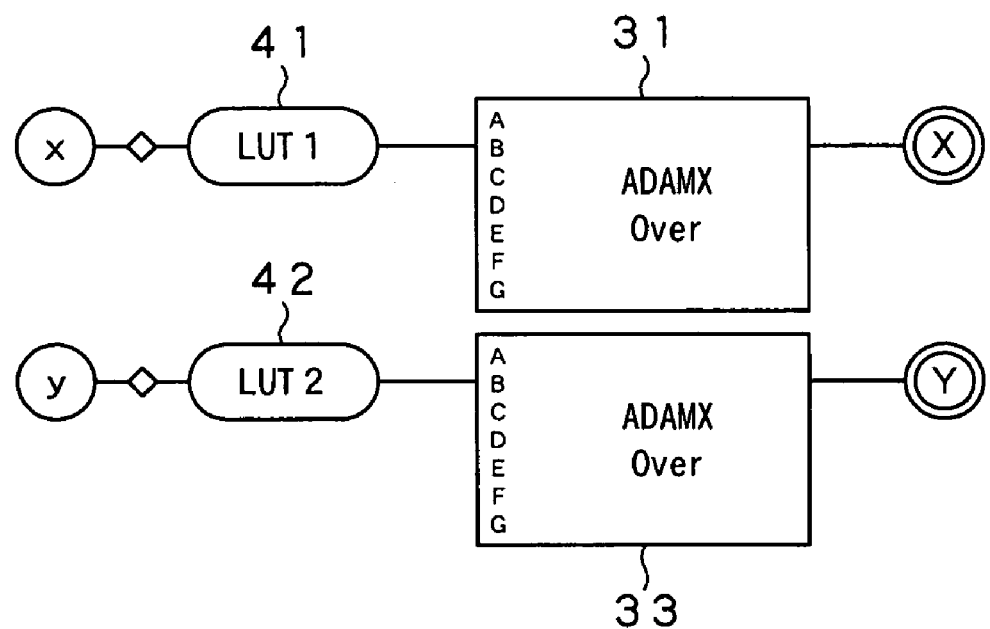
FIG. 6 illustrates the hardware structure of a read address generator for achieving the plural picture arraying effect.

Referring now to FIG. 6, the hardware structure of the read address generator 3 in case of carrying out the plural picture arraying effect is explained.

The read address generator 3 includes plural modules, such as an adder-multiplier and a polar coordinate to rectangular coordinate converter, and executes the above calculations, based on the combination of these modules.

In executing the plural picture arraying effect, an LUT (look-up table) 41, an LUT 42, an ADAMX (Over) 31 and an ADAMY (Over) 33 of the read address generator 3 are used, as shown in FIG. 6.

The LUTs 41, 42 are RAM (random access memory) tables, referred to by an address designated by cross-points indicated by diamond-shaped marks in the drawing. The data are set by a central processing unit (CPU), not shown. In the LUTs 41, 42, the function $f_1(x)$ indicated by the equation (1-2) and the function $f_2(y)$ indicated by the equation (1-3) are pre-set by the CPU, not shown.

The ADAMX (Over) 31 and the ADAMY (Over) 33 are provided with terminals A to G, and execute the calculations of (A+B)×(C+D)+E+F+G by addition and multiplication. For the terminals A to G, constant numbers or the cross-points indicated by the diamond-shaped marks in the drawing may be designated.

The operation of conversion from the read address (x, y) to the address (X, Y) by the above-described read address generator 3 is now explained.

The LUT 41 substitutes the read address x into the function $f_1(x)$ to send the resulting function to the ADAMX (Over) 31.

The LUT 42 substitutes the read address y into the function $f_2(y)$ to send the resulting function to the ADAMY (Over) 32.

The ADAMX (Over) 31 outputs values of the function $f_1(x)$, supplied from the LUT 41, to execute the equation (1-1) to yield the address X.

The ADAMY (Over) 33 outputs values of the function $f_2(y)$, supplied from the LUT 41, to execute the equation (1-1) to yield the address Y.

In this manner, the special picture effect device 1 uses the hardware, forming the read address generator 3, by a suitable combination, for converting the read address (x, y), entered to the read address generator 3, into the address (X, Y), used for outputting a picture corresponding to the picture which is stored in the frame buffer 2 and which has been subjected to the plural picture arraying effect.

2. Effect of Rotation about an Optional Center

Figure 7:
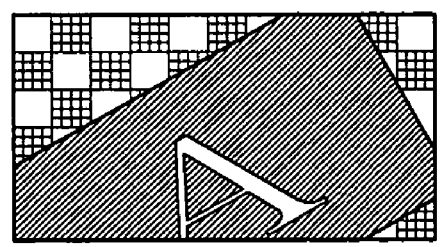
FIG. 7 shows an example of a picture obtained on applying an effect of rotation about an optional center by the special picture effect device.

The effect of rotation about an optional center is a special effect of causing rotation of a picture, about an optional location on a two-dimensional space as the center of rotation, as shown in FIG. 7.

When a sequential read address (x, y) is designated for the read address generator 3, the address (X, Y) of the picture data read out from the frame buffer 2 may be found by the process as now explained.

Figures 8, 9:
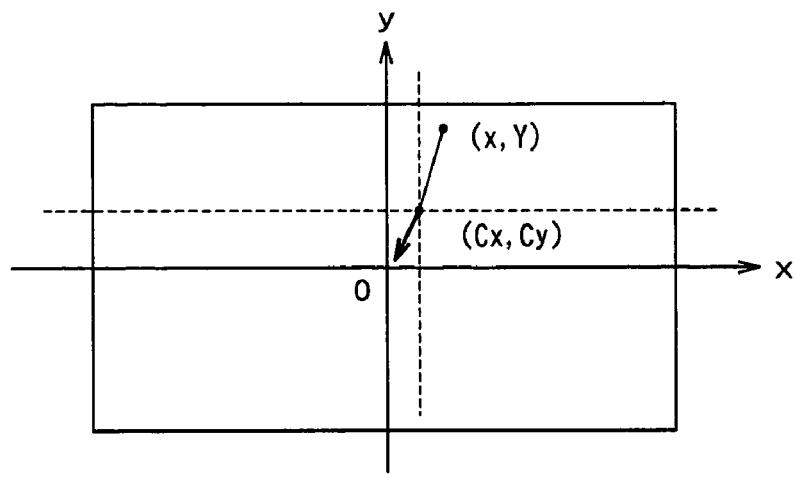
FIG. 8 illustrates coordinate transformation.
FIG. 9 shows parameters supplied to a read address generator in executing an effect of rotation about an optional center.

A picture to be output is mapped to the rectangular coordinate system, the point of origin of which coincides with the center of the picture, as shown in FIG. 8. On this rectangular coordinate are plotted the read address (x, y) and a center point (cx, cy) as the center of rotation. The center point (cx, cy) may be set at an optional location in the picture by the parameters fixCenterX and fixCenterY shown in FIG. 9. The default values of the fixCenterX and fixCenterY are 0 for which the center point (cx, cy) is coincident with the point of origin of the rectangular coordinate system.

First, in finding the address (X, Y), associated with the read address (x, y), it is easier to consider the rotation about the point of origin as the center than the rotation about the center point (cx, cy). Thus, the following equation (2-1):

$$x0=x-cx$$
$$y0=y-cy \quad (2\text{-}1)$$

is used to convert the read address (x, y) to an address (x0, y0) about the point of origin as the center.

The following equation (2-2):

$$r = \sqrt{x0^2 + y0^2}$$
$$\theta = \arctan\left(\frac{y0}{x0}\right) \quad (2\text{-}2)$$

then is used to convert the rectangular coordinate system into the polar coordinate system.

Figure 10:
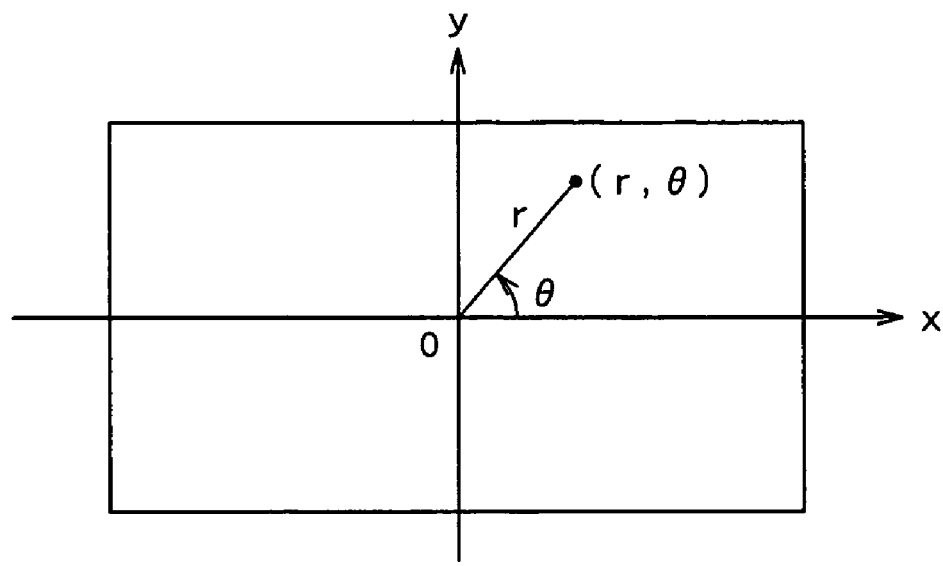
FIG. 10 illustrates polar coordinate transformation.

This converts the address (x0, y0) to an address (r, θ), as shown in FIG. 10.

Figure 11:
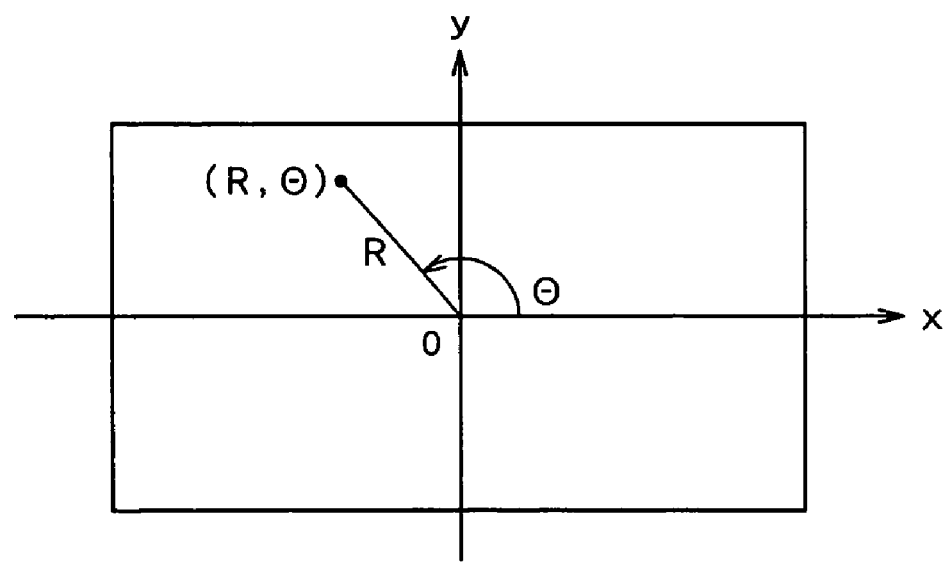
FIG. 11 illustrates address transformation.

The address (r, θ) then is rotated, by the following equation (2-3):

$$R=r$$
$$\Theta=f_1(\theta) \quad (2\text{-}3)$$

to calculate the as-rotated address (R, Θ), as shown in FIG. 11.

Meanwhile, the function $f_1(\theta)$ in the equation (2-3) may be represented by the following equation (2-4):

$$f_1(\theta)=\theta-\text{fixRotate}\times 2\pi \quad (2\text{-}4).$$

The parameter fixRotate, used in the equation (2-4), is a parameter determining the quantity of rotation, as shown in FIG. 9. For example, in case fixRotate is 1.0, the address is rotated by one complete revolution, about the center point (cx, cy) as the center of rotation, as may be seen from the equation (2-4).

Then as-rotated address (R, Θ) then is converted from the address of the polar coordinate system to the address of the rectangular coordinate system (X0, Y0), using the equation (2-5):

$$X0=R\cos\Theta$$
$$Y0=R\sin\Theta \quad (2\text{-}5).$$

The address (X0, Y0) is the address obtained on rotation about the center of origin of the rectangular coordinate system. Thus, using the following equation (2-6):

$$X=X0+cx$$
$$Y=Y0+cy \quad (2\text{-}6)$$

an address rotated about the center point (cx, cy) is found.

In this manner, the read address generator 3 converts the read address (x, y) to the address (X, Y) of the picture data stored in the frame buffer 2.

Figure 12:
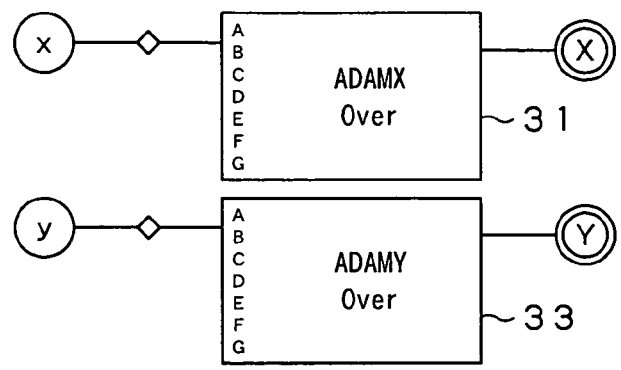
FIG. 12 illustrates the hardware structure of a read address generator for achieving the effect of rotation about an optional center.
Figure 13:
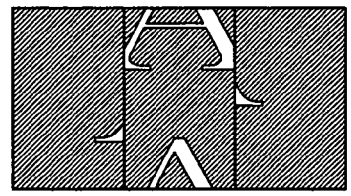
FIG. 13 shows an example of a picture obtained on applying a fragmented tube-like rotation effect by the special picture effect device.

Then, referring to FIG. 12, the hardware structure of the read address generator 3 in case of carrying out the effect of rotation about an optional center is explained.

The read address generator 3 includes plural modules, such as an adder-multiplier and a polar coordinate to rectangular coordinate converter, and executes the above calculations, based on the combination of these modules.

In carrying out the effect of rotation about an optional center, an ADAMX (Over) 31 and an ADAMY (Over) 33, as adder-multiplier of the read address generator 3, are used, as shown in FIG. 12.

The ADAMX (Over) 31 and the ADAMY (Over) 33 are provided with terminals A to G, and apply the calculations of (A+B)×(C+D)+E+F+G to values supplied to these terminals by addition and multiplication. For the terminals A to G, constant numbers or the cross-points indicated by the diamond-shaped marks in the drawing may be designated.

In the effect of rotation about an optional center, x=(x−cx)cos θ−(y−cy)sin θ, y=(x−cx)sin θ+(y−cy)cos θ, as values obtained on matrix calculations as pre-processing, are supplied to the ADAMX (Over) 31 and to the ADAMY (Over) 33, respectively.

The ADAMX (Over) 31 and the ADAMY (Over) 33 add cx and cy to the input values, respectively, to execute the equation (2-6) to calculate the address (X, Y).

In this manner, the special picture effect device 1 uses the hardware, forming the read address generator 3, by a suitable combination, for converting the read address (x, y), entered to the read address generator 3, into the address (X, Y), used for outputting a picture corresponding to the picture which is stored in the frame buffer and which has been subjected to the plural picture arraying effect.

3. Fragmented Tube-Like Rotation Effect

The fragmented tube-like is a special effect in which a picture fragmented in the vertical direction at an optional location becomes a tubular rotating member rotated in the direction of the fragmentation. A picture may be fragmented in the horizontal direction, as in the case of the vertical direction, with the resulting rotating member being then rotated in the direction of the fragmentation. In case a picture is fragmented in the vertical direction, the effect like that of a so-called slot machine may be achieved.

Figure 14:
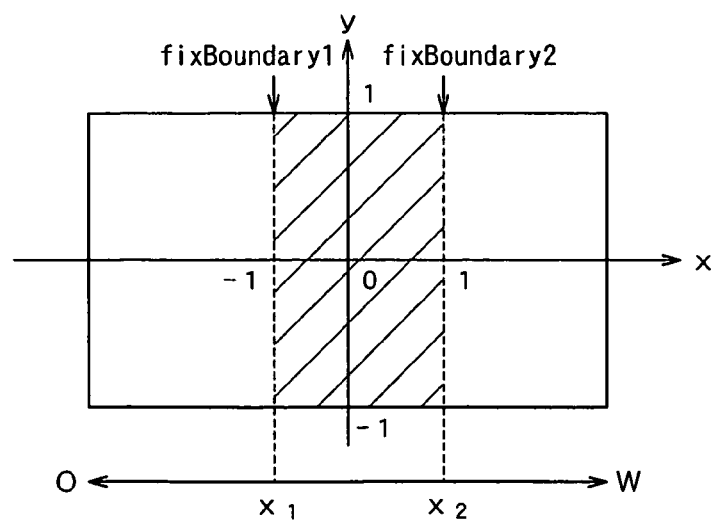
FIG. 14 illustrates a case in which a picture area has been split in the vertical direction.

The case in which the picture is fragmented in the vertical direction and the partial picture resulting from the fragmentation is rotated in the vertical direction is explained. An output picture is mapped to the rectangular coordinate system, the point of origin of which corresponds to the center of the picture, as shown in FIG. 14. On this rectangular coordinate system, fixBoundary 1 and fixBoundary 2 represent the parameters for designating the position of picture fragmentation as provided to the read address generator 3. The parameters fixBoundary 1 and fixBoundary 2 define the left and right boundary positions of the picture, respectively. The picture is fragmented at the boundary locations delimited by these parameters parameters fixBoundary 1 and fixBoundary 2, with the resulting fragmented pictures then acting as respective independent rotating members.

Suppose that the boundary positions, specified by the parameter parameters fixBoundary 1 and fixBoundary 2, are x1 and x2, respectively. Then, since the picture has a width W, it is sufficient to consider a rotating member such that $0 \leq x < x1$, a rotating member such that $x1 \leq x < x2$ and a rotating member such that $x2 \leq x < W$.

Figures 15, 16:
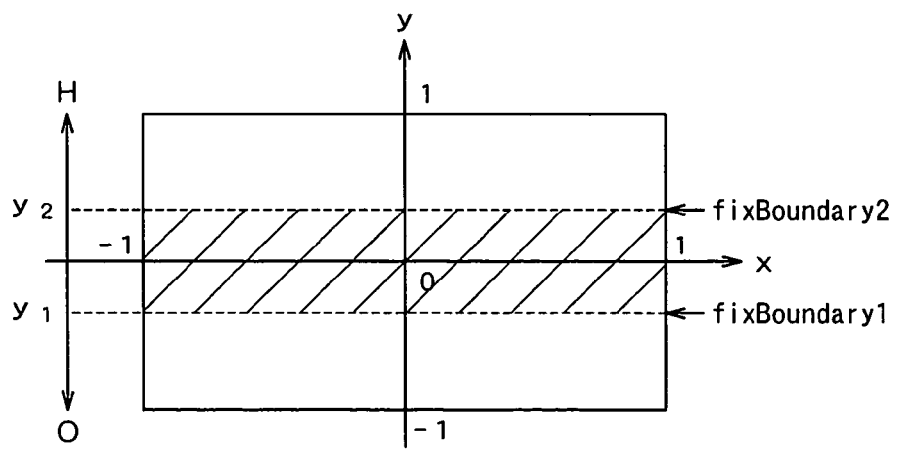
FIG. 15 shows parameters supplied to the read address generator 3 in executing the fragmented tube-like rotation effect.
FIG. 16 illustrates the case in which the picture area has been split in the horizontal direction.

The amount of offset of each rotating member may be set by a parameter imparted to the read address generator 3. A plural number of parameters, including fixBoundary 1 and fixBoundary 2, are shown in FIG. 15. The amounts of offsetof the respective rotating members are given as fixOffset 1, fixOffset 2 and fixOffset 3, respectively. The range of the amount of the offset is −8.0 to 8.0, with the amount of complete revolution of the rotating member being 1.0. The minus and plus values denote the downward rotation and the upward rotation, respectively. The default of the direction of the picture fragmentation is the vertical direction.

When the sequential read address (x, y) is designated for the read address generator 3, the address (X, Y) of the picture data read out from the frame buffer 2 may be found by the process as now explained.

First, in finding the address (X, Y) associated with the read address (x, y), the coordinate system of the picture data stored in the frame buffer 2 needs to be converted into the coordinate system for calculations. To this end, the read address (x, y) is converted to the address (x0, y0), using the following equation (3-1):

$$x0 = x - cx$$

$$y0 = y - cy \qquad (3\text{-}1).$$

The rotating member then is rotated, using the following equation (3-2):

$$X0 = x0$$

$$Y0 = f_2(y0 - f_1(x0)) \qquad (3\text{-}2).$$

That is, the picture is output with a predetermined offset.

Meanwhile, the functions $f_1(x0)$, $f_2(y0-f_1(x0))$ in the equation (3-2) are represented by the following equations (3-3), (3-4), respectively:

$$f_1(x0) = \begin{cases} \text{fixOffset1} \times H & (0 \leq x0 < x_1) \\ \text{fixOffset2} \times H & (x_1 \leq x0 < x_2) \\ \text{fixOffset3} \times H & (x_2 \leq x0 < W) \end{cases} \qquad (3\text{-}3)$$

$$f_2(y) = y (\bmod H) \qquad (3\text{-}4)$$

where
W=picture width
H=(post-crop) picture height
x1=0.5 W(1+fixBoundary1)
x2=0.5 W(1+fixBoundary2).

Thus, the respective rotating members are rotated by fixOffset1×H, fixOffset2×H and fixOffset3×H, along the y-axis direction, respectively. The value obtained with the equation (3-4) takes the modulo with the picture height H (modH), so that rotation is repeated in case the value of fixOffset is set so as to be larger than 1.0.

The addresses (X0. Y0) of the respective rotating members, rotated using the equation (3-2), are converted, using the following equation (3-5):

$$X = X0 + cx$$

$$Y = Y0 + cy \qquad (3\text{-}5)$$

in order to find the addresses (X, Y).

In this manner, the read address generator 3 converts the read address (x, y) into the address (X, Y) of picture data stored in the frame buffer 2.

The case in which the picture is fractionated in the horizontal direction and the partial pictures resulting from the fragmentation are rotated in the horizontal direction is explained. As in the case of fractionating the picture in the vertical direction, an output picture is mapped to the rectangular coordinate system, the point of origin of which corresponds to the center of the picture, as shown in FIG. 16. A parameters fixBoundary 1 and a parameter fixBoundary 2 define the upper and lower boundary positions of the picture, respectively. The picture is fragmented at the boundary locations delimited by these parameters parameters fixBoundary 1 and fixBoundary 2, with the resulting fragmented pictures then acting as respective independent rotating members.

Suppose that the boundary positions, specified by the parameters fixBoundary 1 and fixBoundary 2, are y1 and y2, respectively. Then, since the picture has a height H, it is sufficient to consider a rotating member such that $0 \leq y < y1$, a rotating member such that $y1 \leq y < y2$ and a rotating member such that $y2 \leq y < H$.

The amount of offset of each rotating member may be set by a parameter imparted to the read address generator 3. A plural number of parameters, including fixBoundary 1 and fixBoundary 2, are shown in FIG. 15. The amounts of offset of the respective rotating members are given as fixOffset 1, fixOffset 2 and fixOffset 3, respectively. The range of the amount of the offset is −8.0 to 8.0, with the amount of complete revolution of each rotating member being 1.0. The minus and plus signs denote the downward rotation and the upward rotation, respectively.

When the sequential read address (x, y) is designated for the read address generator 3, the address (X, Y) of the picture data read out from the frame buffer 2 may be found by the process as now explained.

First, in finding the address (X, Y) associated with the read address (x, y), the coordinate system of the picture data stored in the frame buffer 2 needs to be converted into the coordinate system for calculations. To this end, the read address (x, y) is converted to the address (x0, y0), using the following equation (3-6):

$$x0 = x - cx$$

$$y0 = y - cy \qquad (3\text{-}6).$$

The rotating member is then rotated, using the equation (3-7):

$$X0 = f_4(x0 - f_3(y0))$$

$$Y0 = y0 \qquad (3\text{-}7).$$

That is, the picture is output with a predetermined offset.

Meanwhile, the functions $f_3(y0)$ and $f_4(x0-f_3(y0))$ in the above equation (3-7) are represented by the following equations (3-8), (3-9), respectively:

$$f_3(y0) = \begin{cases} fixOffset1 \times W & (0 \leq y0 < y_1) \\ fixOffset2 \times W & (y_1 \leq y0 < y_2) \\ fixOffset3 \times W & (y_2 \leq y0 < H) \end{cases} \quad (3\text{-}8)$$

$$f_4(x) = x(\text{mod } W) \quad (3\text{-}9)$$

where
W=(post-crop) picture width
H=picture height
$y_1$=0.5 H(1+fixBoundary1)
$y_2$=0.5 H(1+fixBoundary2).

Thus, the respective rotating members are rotated by fixOffset1×H, fixOffset2×H and fixOffset3×H, along the y-axis direction. The value obtained with the equation (3-9) takes the modulo with the picture width W (modW), so that rotation is repeated in case the value of fixOffset is set so as to be larger than 1.0.

The addresses (X0. Y0) of the respective rotating members, rotated using the equation (3-7), are converted, using the following equation (3-10):

$$X = X0 + cx$$

$$Y = Y0 + cy \quad (3\text{-}10)$$

in order to find the addresses (X, Y).

In this manner, the read address generator 3 converts the read address (x, y) into the address (X, Y) of picture data stored in the frame buffer 2.

The hardware structure of the read address generator 3 in carrying out the fractionated tube-like rotation effect is now explained with reference to FIGS. 17 and 18.

In carrying out the fractionated tube-like rotation effect, the hardware structure of the read address generator 3 differs with respect to the difference in the ISlotType indicative of the sort of the fractionating direction.

First, the case in which the ISlotType is vertical is explained.

The read address generator 3 includes plural modules, such as an adder-multiplier and a polar coordinate to rectangular coordinate converter, and executes the above calculations, based on the combination of these modules.

Figure 17:
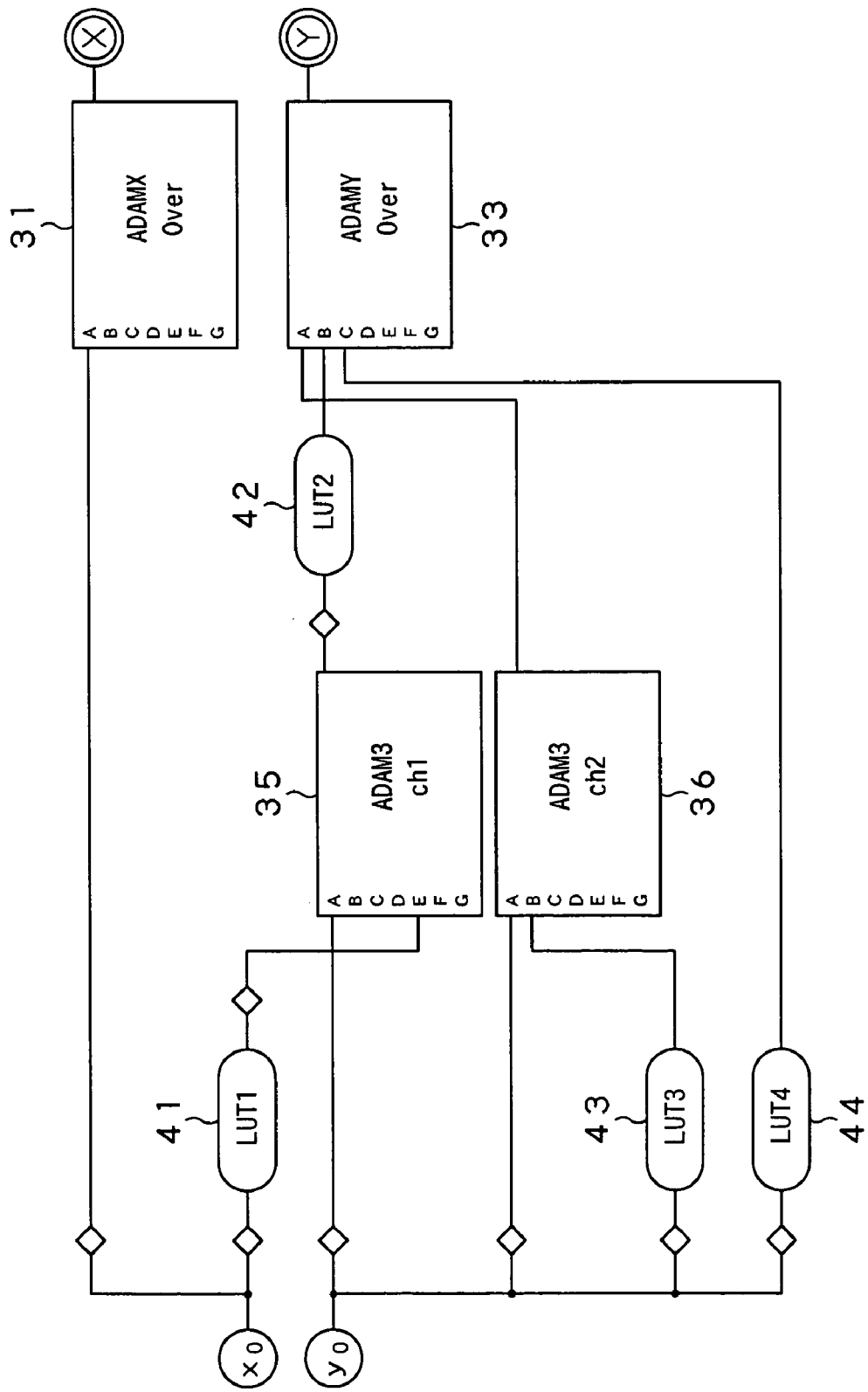
FIG. 17 illustrates the hardware structure of the read address generator, adapted for achieving the fragmented tube-like rotation effect in case the picture area has been split in the vertical direction.

In executing the fractionated tube-like rotation effect, LUTs (look-up tables) 41 to 44, an ADAMX (Over) 31, an ADAMY (Over) 33 an ADAMX (Ch1) 35, and an ADAMY (Ch2) 36 of the read address generator 3 are used, as shown in FIG. 17.

The LUTs 41 to 44 are RAM (random access memory) tables, referred to by an address designated by cross-points indicated by diamond-shaped marks in the drawing. The data are set by a central processing unit (CPU), not shown.

The ADAMX (Over) 31, ADAMY (Over) 33, ADAMX (Ch1) 35 and the ADAMY (Ch2) 36 are each provided with terminals A to G, and apply the calculations of (A+B)×(C+D)+E+F+G by addition and multiplication. For the terminals A to G, constant numbers or the cross-points indicated by diamond-shaped marks in the drawing may be designated.

The operation of conversion from the read address (x, y) to the address (X, Y) by the above-described read address generator 3 is now explained. Meanwhile, the calculations shown in the equation (3-1) have been carried out by matrix calculations, and the address (x0, y0), obtained on conversion, are supplied to the read address generator 3.

The ADAMX (Over) 31 is supplied with the address x0 via cross-point. Since the address x0 supplied is the address X0, from the equation (3-2), the ADAMX (Over) 31 adds cx thereto in order to calculate the address X.

The LUT 41 substitutes the input address x0 to the function $f_1(x0)$ to execute the equation (3-3) to send the output to the ADAMX (Ch1) 35.

The ADAMX (Ch1) 35 subtracts an output from the LUT 41 from the input address y0 to send the output to the LUT 42.

The LUT 42 substitutes the output from the ADAMX (Ch1) 35 into the function $f_2(y)$ to send the result to the ADAMY (Over) 33. The LUT 42 carries out modulo processing, based on the picture height H, and sends the result to the ADAMY (Over) 33.

In the LUTs 43, 44 are stored data for applying the function $f_2(y)$ of the equation (3-4) only to a partial area, in an area such that $0 \leq y \leq H$, which is to be processed with the fragmented tube-like effect. If the input y0 is an area to be processed with the special effect, the LUT 43 outputs 0 to the ADAMY (Ch2) 36 and, if the input y0 is an area to be processed with the special effect, the LUT 44 outputs 1 to the ADAMY (over) 33.

The ADAMY (Ch2) 36 multiplies y0 with the output of the LUT 43 to send the result to the ADAMY (Over) 33.

The ADAMY (Over) 33 multiplies the output of the LUT 42 with the output of the LUT 44 and sums the output of the ADAMY (Ch2) 36 to the product to calculate the address Y0. The ADAMY (Over) 33 also sums cy to the so calculated address Y0 to execute (3-5) to calculate the address Y.

The case in which ISlotType is Horizontal is now explained.

Figure 18:
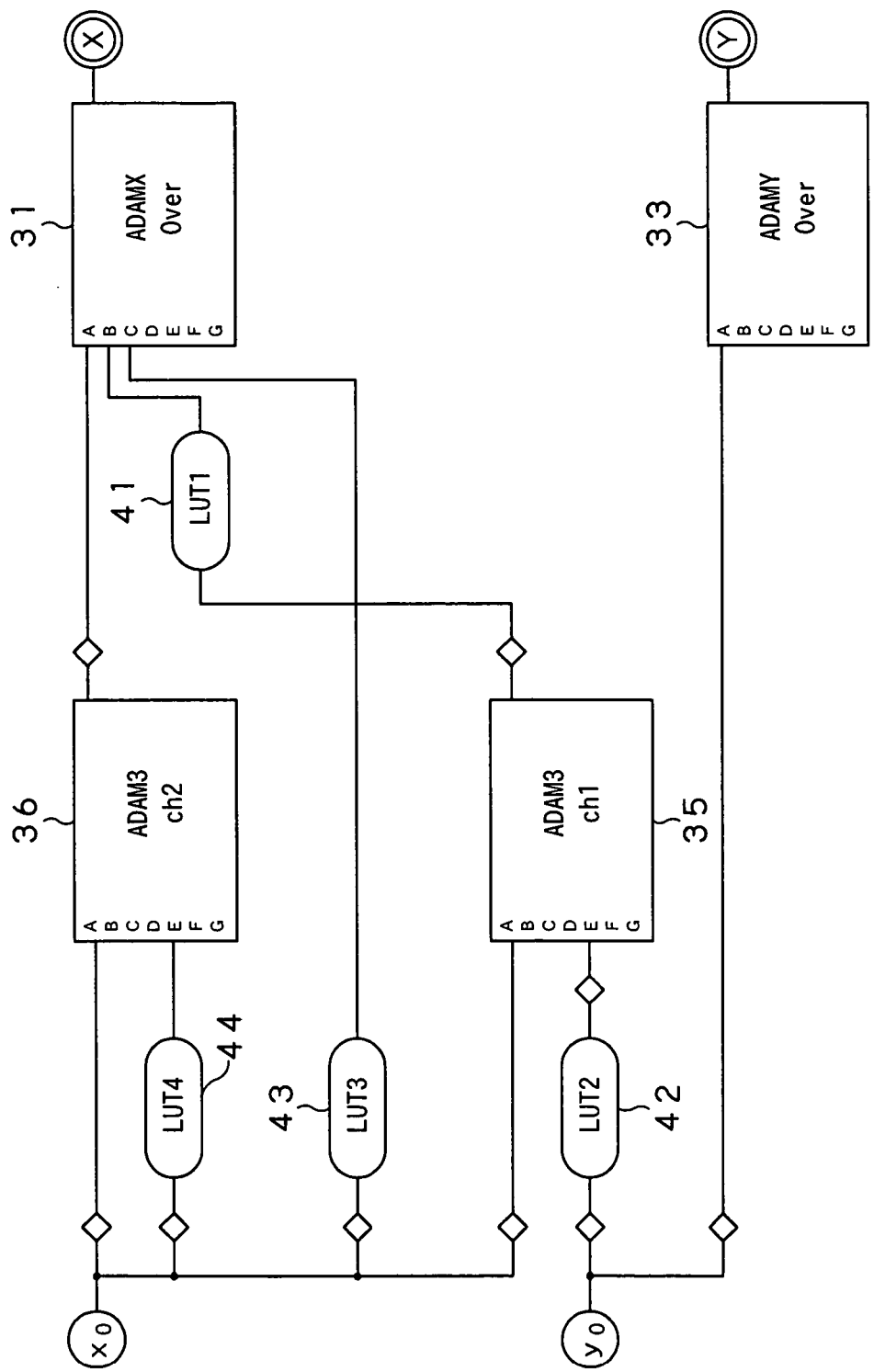
FIG. 18 illustrates the hardware structure of the read address generator, adapted for achieving the fragmented tube-like rotation effect in case the picture area has been split in the horizontal direction.

In executing the fragmented tube-like rotation effect (ISlotType=Horizontal), the LUTs (look-up tables) 41 to 44, ADAMX (Over) 31, ADAMY (Over) 33, ADAMX (Ch1) 35 and the ADAMY (Ch2) 36 of the read address generator 3, as shown in FIG. 18.

The operation of converting the read address (x, y) into the address (X, Y) by the above-described read address generator 3 is hereinafter explained. It is noted that the calculations shown in the equation (3-6) were carried out on the read address (x, y) as pre-processing by the matrix calculations, and that the address (x0, y0) as converted is entered to the read address generator 3.

The ADAMY (Over) 33 is supplied over the cross-point with the address y0. Since the address supplied is the address Y0, from the equation (3-7), the ADAMY (Over) 33 sums cy to Y0 to execute the equation (3-10) in order to calculate the address Y.

The LUT 42 substitutes the input address y0 to the function $f_3(y0)$ to execute the equation (3-8) and directs the result to the ADAMX (Ch1) 35.

The ADAMX (Ch1) 35 subtracts the output from the LUT 42 from the input address x0 to send the result to the LUT 41.

The LUT 41 substitutes an output of the ADAM(Ch1) 35 to the function f4(X) to send the result to the ADAMX(Over) 31. The LUT 41 performs modulo W arithmetic, where W is the picture width, to send the result to the ADAMX(Over) 31.

In the LUTs 43, 44 are stored data for applying the function $f_4(x)$ of the equation (3-9) to a partial area of the area of $0 \leq x \leq W$ to which the fragmented tube-like rotation effect is to be applied. In case the input x0 is an area to be processed with the special effect, the LUT 41 outputs 1 to the ADAMY (Ch2) 36. In case the input x0 is an area to be processed with the special effect, the LUT 43 outputs 0 to the ADAMX (Over) 31.

The ADAMY (Ch2) 36 multiplies x0 with the output of the LUT 44 to send the result to the ADAMX (Over) 31.

The ADAMX (Over) 31 multiplies the output of the LUT 41 with the output of the LUT 43 and sums the result to the output of the ADAMY (Ch2) 36 to calculate the address X0. The ADAMX (Over) 31 further sums cx to the so calculated address to execute the equation (3-10) in order to calculate the address X.

In this manner, the special picture effect device 1 uses the hardware, forming the read address generator 3, by a suitable combination, for converting the read address (x, y), entered to the read address generator 3, into the address (X, Y) usable for reading out a picture corresponding to the picture which is stored in the frame buffer 2 and which has been processed with the fragmented tube-like rotation effect.

4. Triangular Mosaic Effect

The triangular mosaic effect is the special effect for demonstrating a triangular mosaic in a picture, as shown in FIG. 19. Although only a portion of the picture is in a triangular mosaic pattern in FIG. 19, the entire picture may be processed to provide a mosaic pattern, as shown in FIG. 20, by reading out a picture from the frame buffer 2 by address conversion by the read address generator 3 and by applying the triangular mosaic effect thereto.

The picture processed in its entirety to give the mosaic effect is masked by the picture synthesizing unit 5, using the picture stored in the frame buffer 4, whereby it is possible to output a picture only a portion of which is in a mosaic surface pattern, as shown in FIG. 19.

Referring to FIG. 21, the parameters supplied to the read address generator 3 when executing the triangular mosaic effect are hereinafter explained. The parameters fixWidthX and fixWidthY determine the widths in the x and y directions, respectively. More specifically, these parameters indicate the ratio of wx and wy in FIG. 20 when the width W and the height H of the picture are set to unity (1).

As will be explained in detail subsequently, wx and wy, needed in effecting the conversion to the address (X, Y), may be calculated by multiplying the width and the height of the picture with fixWidthX and fixWidthY, respectively.

The parameters fixCenterX and fixCenterY are parameters for determining in which portion of a picture the point of origin of the coordinate system is to be put when the picture is placed in the rectangular coordinate system. If (fixCenterX, fixCenterY)=(−1, 1), the point of origin is at the left upper corner of the picture, whereas, if (fixCenterX, fixCenterY)=(0, 0), the point of origin is at the center of the picture. The default is (fixCenterX, fixCenterY)=(0, 0).

When the sequential read address (x, y) is designated for the read address generator 3, the address (X, Y) of picture data read out from the frame buffer 2 may be found by the following process:

First, in finding the address (X, Y), associated with the read address (x, y), the read address (x, y) is converted to the address (x0, y0), for converting the coordinate system for the picture data stored in the frame buffer 2 into the coordinate system for calculations, using the following equation (4-1):

$$x0 = x - cx$$

$$y0 = y - cy \tag{4-1}$$

The address (x0, y0) is then converted to the address (X0, Y0), for outputting a picture in a triangular mosaic pattern shown for example in FIG. 20, using the equation (4-2):

$$X0 = f_1(x0)$$

$$Y0 = f_2(y0 + f_3(x0) \times f_4(y0)) \tag{4-2}$$

Meanwhile, the functions $f_1(x0)$, $f_2(y)$, $f_3(x0)$ and $f_4(y0)$ are indicated by the following equations (4-3), (4-4), (4-5) and (4-6), respectively:

$$f_1(x0) = \left(\left[\frac{x0}{w_x}\right] + 0.5\right) \times w_x \tag{4-3}$$

$$f_2(y) = \left[\frac{y + 0.25 \times w_y}{0.5 \times w_y}\right] + 0.5 \times w_y \tag{4-4}$$

$$f_3(x0) = \begin{cases} \dfrac{x0(\text{mod } w_x)}{w_x} - 0.5 & (x(\text{mod }2w_x) \leq w_x) \\ 0.5 - \dfrac{x0(\text{mod } w_x)}{w_x} - 0.5 & (x(\text{mod }2w_x) > w_x) \end{cases} \tag{4-5}$$

$$f_4(y0) = \begin{cases} w_y & (y0(\text{mod }w_y) \leq 0.5 \times w_y) \\ -w_y & (y0(\text{mod }w_y) > 0.5 \times w_y) \end{cases} \tag{4-6}$$

where $w_x$=fixWidthX×picture width
$w_y$=fixWidthY×picture height
[ ] denotes the Gaussian symbol.

Figure 22:
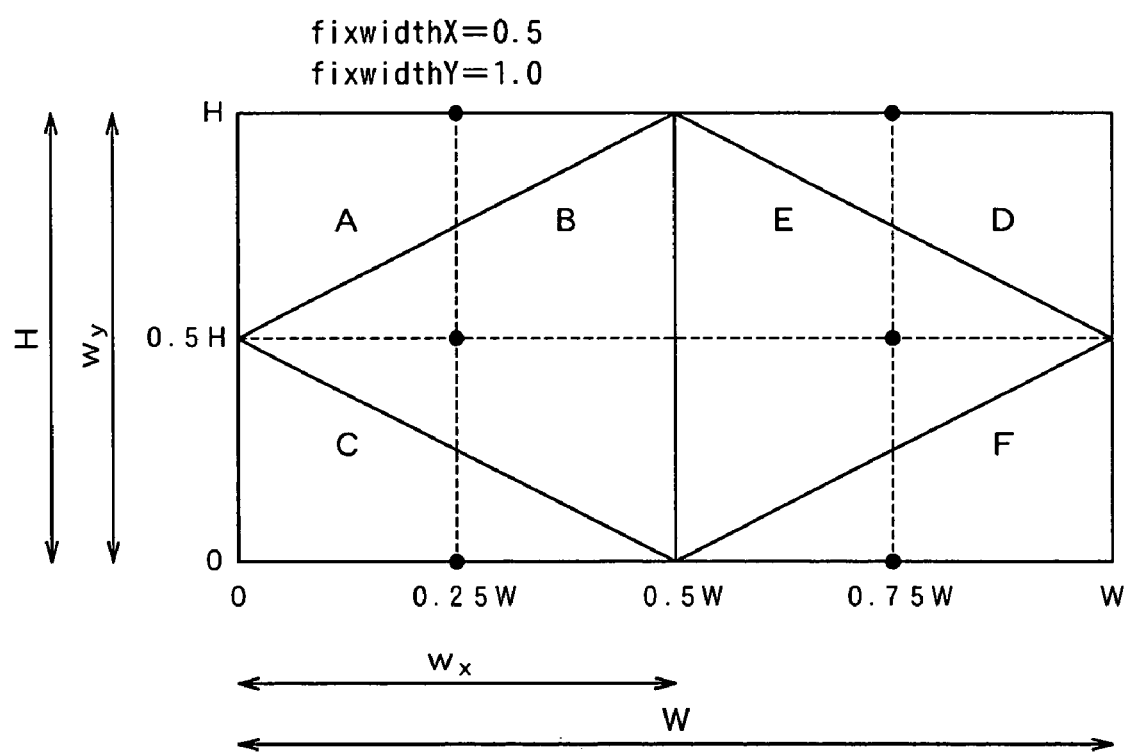
FIG. 22 specifically illustrates the triangular mosaic effect.

Referring to FIG. 22, the manner in which the address (x0, y0) is converted to the address (X0, Y0) by the equation (4-2) is hereinafter explained. FIG. 22 shows a picture output in accordance with the equation (4-2) when the parameters fixWidthX and fixWidthY are set so that fixWidthX=0.5 and fixWidthY=1.0, respectively.

With fixWidthX=0.5, $w_x$=0.5 W, so that the address x0 in a range of $0 \leq x0 < 0.5$ W is converted, from the equation (4-3), into X0=$f_1$(x0)=0.5 $w_x$=0.25 W.

On the other hand, the address x0 in a range of 0.5 W$\leq$x0$\leq$W is converted, from the equation (4-3), into X0=$f_1$(x0)=1.5 $w_x$=0.75 W.

With fixWidthY=1.0, since $w_y$=H, the address y0 in the areas A and D shown in FIG. 22 is converted to Y0=$f_2$(y0+$f_3$(x0)×$f_4$(x0))=H. The address y0 in areas B and E is converted to Y0=0.5 H, while the address y0 in areas C and F is converted to Y0=0.

To summarize, picture data with an address (X0, Y0)=(0.25 W, H) is output in a triangle having the area A, picture data with an address (X0, Y0)=(0.25 W, 0.5 H) is output in a triangle having the area B, picture data with an address (X0, Y0)=(0.25 W, 0) is output in a triangle having the area C, picture data with an address (X0, Y0)=(0.75 W, H) is output in a triangle having the area D, picture data with an address (X0, Y0)=(0.75 W, 0.5 H) is output in a triangle having the area E, and picture data with an address (X0, Y0)=(0.75 W, 0) is output in a triangle having the area F.

That is, picture data of the same address are output in each triangular area, so that triangular-shaped mosaic pictures are generated.

The address (X0, Y0) is found by moving the point of origin of the coordinate system by the equation (4-1), and hence the address (X, Y) is found using the equation (4-7):

$$X = X0 + cx$$

$$Y = Y0 + cy \tag{4-7}$$

In this manner, the read address generator 3 converts the read address (x, y) to an address (X, Y) of the picture data stored in the frame buffer 2.

Figure 23:
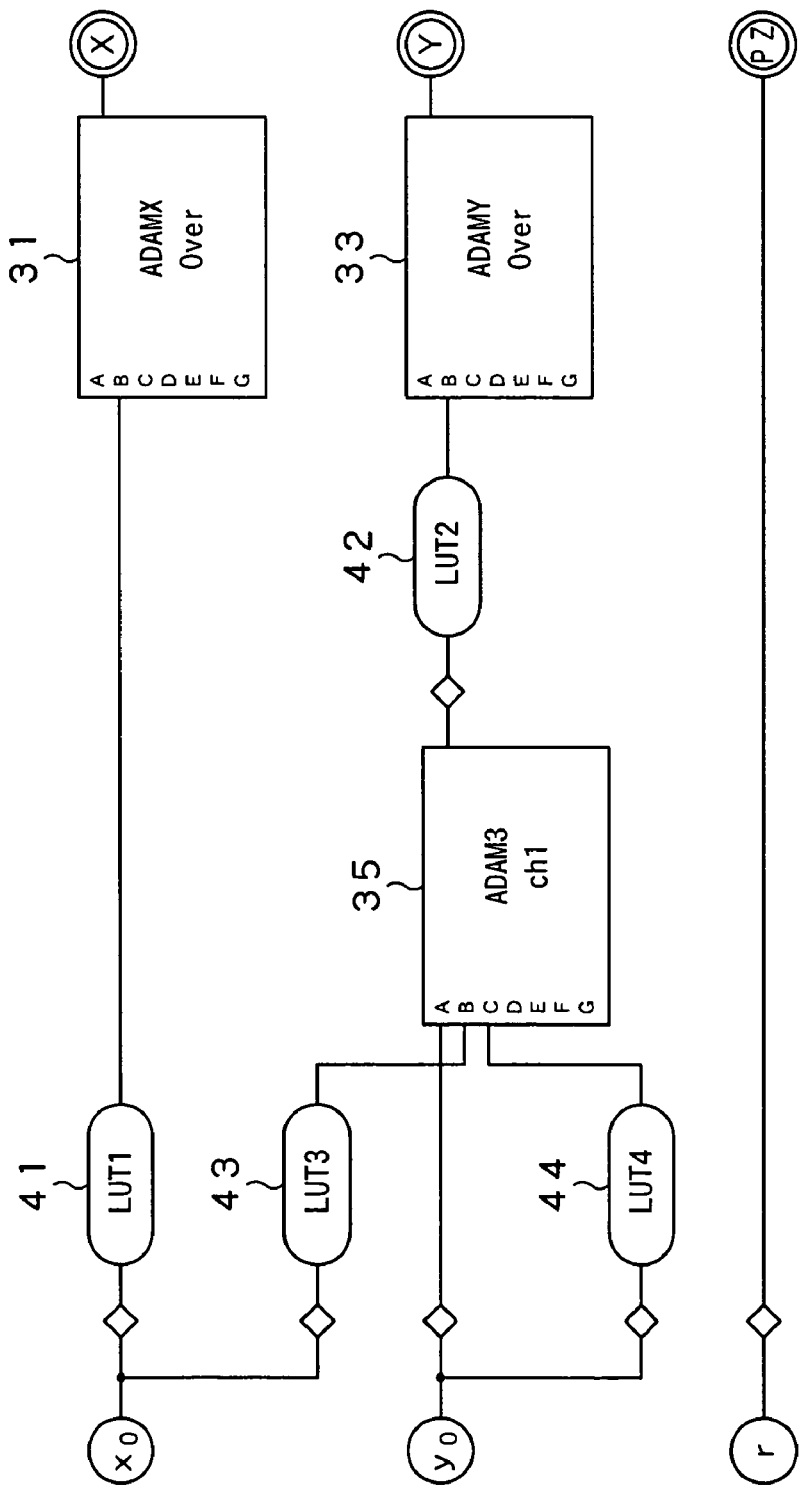
FIG. 23 illustrates the hardware structure of the read address generator for realizing the triangular mosaic effect.

Referring to FIG. 23, the hardware structure of the read address generator 3 in executing the triangular mosaic effect is explained.

The read address generator 3 includes plural modules, such as an adder-multiplier and a polar coordinate to rectangular coordinate converter, and executes the above calculations, based on the combination of these modules.

In executing the triangular mosaic effect, LUTs (lookup tables) 41 to 44, an ADAMX (Over) 31, an ADAMY (Over) 33 and an ADAMX (Ch1) 35 are used, as shown in FIG. 23.

The LUTs 41 to 44 are RAM (random access memory) tables, referred to by an address designated by cross-points indicated by diamond-shaped marks in the drawing. The data are set by a central processing unit (CPU), not shown. In the LUTs 41 to 44, the function $f_1(x0)$, indicated by the equation (4-3), the function $f_2(x0)$, indicated by the equation (4-4), the function $f_3(x0)$, indicated by the equation (4-5), and the function $f_4(x0)$, indicated by the equation (4-6), are set.

The ADAMX (Over) 31, ADAMY (Over) 33 and the ADAMX (Ch1) 35 are each provided with terminals A to G, and apply the calculations of (A+B)×(C+D)+E+F+G by addition and multiplication. For the terminals A to G, constant numbers or the cross-points indicated by the diamond-shaped marks in the drawing may be designated.

The operation of conversion from the read address (x, y) to the address (X, Y) by the above-described read address generator 3 is now explained. Meanwhile, the calculations shown in the equation (4-1) have been executed by matrix calculations, as pre-processing, on the read address (x, y) and the address (x0, y0), obtained on conversion, are supplied to the read address generator 3.

From the equation (4-2), the function $f_1(x0)$, supplied from the LUT 41, is the address X0. Thus, the ADAMX (Over) 31 adds cx to the address X0 to execute the equation (4-7) to calculate the address X.

The ADAMX (Ch1) 35 multiplies the function $f_3(x0)$, supplied from the LUT 43, with the function $f_4(y0)$, supplied from the LUT 44, and sums the resulting product to y0.

The LUT 42 enters the output from the ADAMX (Ch1) 35 to the function $f_2(y)$ to execute the equation (4-2) to calculate the address Y0.

The ADAMY (Over) 33 sums cy to the address Y0 supplied from the LUT 42 to execute the equation (4-7) to calculate the address Y.

In this manner, the special picture effect device 1 uses the hardware, forming the read address generator 3, by a suitable combination, for converting the read address (x, y), entered to the read address generator 3, into the address (X, Y), usable for outputting a picture corresponding to the picture which is stored in the frame buffer 2 and which has been processed with the triangular mosaic effect.

What is claimed is:

1. A special effect device in which picture signals are read out from a frame buffer based on an address signal to impart a desired special effect to the picture signals read out from said frame buffer, said special effect device comprising:

address signal generating means for generating a readout address signal of said picture signals stored in said frame buffer so that the picture signals will be output to each of a plurality of corresponding triangular areas of a preset size fractionated from said picture signals stored in said frame buffer, wherein said address signal generating means generates the readout address signal of said picture signals stored in said frame buffer so that the totality of picture signals output in each triangular area will be preset picture signals of the same sort from one of the triangular areas to another; and wherein, with the bottom side and the height of a triangle fractionated from said picture signals being Wy and Wx, respectively, said address signal generating means generates a readout address signal (X0, Y0) for reading out picture signals in an area of said triangle in case the center of said picture signals is at the point of origin of a rectangular coordinate system by the equation (4-2):

$X0 = f_1(x0)$ $Y0 = f_2(y0 + f_3(x0) \times f_4(y0))$ \hfill (4-2)

which satisfies the equations (4-3), (4-4), (4-5) and (4-6):

$$f_1(x0) = \left(\left[\frac{x0}{w_x}\right] + 0.5\right) \times w_x \quad (4\text{-}3)$$

$$f_2(y) = \left[\frac{y + 0.25 \times w_y}{0.5 \times w_y}\right] + 0.5 \times w_y \quad (4\text{-}4)$$

$$f_3(x0) = \begin{cases} \dfrac{x0(\bmod w_x)}{w_x} - 0.5 & (x(\bmod 2w_x) \le w_x) \\ 0.5 - \dfrac{x0(\bmod w_x)}{w_x} - 0.5 & (x(\bmod 2w_x) > w_x) \end{cases} \quad (4\text{-}5)$$

$$f_4(y0) = \begin{cases} w_y & (y0(\bmod w_y) \le 0.5 \times w_y) \\ -w_y & (y0(\bmod w_y) > 0.5 \times w_y) \end{cases} \quad (4\text{-}6)$$

where $w_x$=fixWidthX×picture width $w_y$=fixWidthY×picture height

[] is the Gaussian symbol; and wherein said address signal generating means generates, by the equation (4-7):

$X = X0 + cx$ $Y = Y0 + cy$ \hfill (4-7)

readout signal generating means for generating a readout signal (X,Y) in case the position of the point of origin in the rectangular coordinate system of said picture signals is (cx, cy).

2. An address signal generating device for generating an address signal for reading out picture signals from a frame buffer, said address signal generating device comprising:

address signal generating means for generating a readout address signal of said picture signals stored in said frame buffer so that the picture signals will be output to each of a plurality of corresponding triangular areas of a preset size fractionated from said picture signals stored in said frame buffer, wherein said address signal generating means generates the readout address signal of said picture signals stored in said frame buffer so that the totality of picture signals output in each triangular area will be preset picture signals of the same sort from one of the triangular areas to another; and wherein, with the bottom side and the height of a triangle fractionated from said picture signals being Wy and Wx, respectively, said address signal generating means generates a readout address signal (X0, Y0) for reading out picture signals in an area of said triangle in case the center of said picture signals is at the point of origin of a rectangular coordinate system by the equation (4-2):

$$X0 = f_1(x0)$$

$$Y0 = f_2(y0 + f_3(x0) \times f_4(y0)) \qquad (4\text{-}2)$$

which satisfies the equations (4-3), (4-4), (4-5) and (4-6):

$$f_1(x0) = \left(\left[\frac{x0}{w_x}\right] + 0.5\right) \times w_x \qquad (4\text{-}3)$$

$$f_2(y) = \left[\frac{y + 0.25 \times w_y}{0.5 \times w_y}\right] + 0.5 \times w_y \qquad (4\text{-}4)$$

$$f_3(x0) = \begin{cases} \dfrac{x0(\bmod w_x)}{w_x} - 0.5 & (x(\bmod 2w_x) \leq w_x) \\ 0.5 - \dfrac{x0(\bmod w_x)}{w_x} - 0.5 & (x(\bmod 2w_x) > w_x) \end{cases} \qquad (4\text{-}5)$$

$$f_4(y0) = \begin{cases} w_y & (y0(\bmod w_y) \leq 0.5 \times w_y) \\ -w_y & (y0(\bmod w_y) > 0.5 \times w_y) \end{cases} \qquad (4\text{-}6)$$

where
$w_x$=fixWidthX×picture width
$w_y$=fixWidthY×picture height
[] is the Gaussian symbol; and
wherein said address signal generating means generates, by the equation (4-7):

$$X = X0 + cx$$

$$Y = Y0 + cy \qquad (4\text{-}7)$$

readout signal generating means for generating a readout signal (X,Y) in case the position of the point of origin in the rectangular coordinate system of said picture signals is (cx,cy).

3. An address signal generating method for generating an address signal for reading out picture signals from a frame buffer, said address signal generating method comprising:

an address signal generating step of generating a readout address signal of said picture signals stored in said frame buffer so that the picture signals will be output from said frame buffer to each of a plurality of corresponding triangular areas of a preset size fractionated from said picture signals stored in said frame buffer, wherein said address signal generating step generates the readout address signal of said picture signals stored in said frame buffer so that the totality of picture signals output in each triangular area will be preset picture signals of the same sort from one of the triangular areas to another; and wherein, with the bottom side and the height of a triangle fractionated from said picture signals being Wy and Wx, respectively, said address signal generating step generates a readout address signal (X0, Y0) for reading out picture signals in an area of said triangle in case the center of said picture signals is at the point of origin of a rectangular coordinate system by the equation (4-2):

$$X0 = f_1(x0)$$

$$Y0 = f_2(y0 + f_3(x0) \times f_4(y0)) \qquad (4\text{-}2)$$

which satisfies the equations (4-3), (4-4), (4-5) and (4-6):

$$f_1(x0) = \left(\left[\frac{x0}{w_x}\right] + 0.5\right) \times w_x \qquad (4\text{-}3)$$

$$f_2(y) = \left[\frac{y + 0.25 \times w_y}{0.5 \times w_y}\right] + 0.5 \times w_y \qquad (4\text{-}4)$$

$$f_3(x0) = \begin{cases} \dfrac{x0(\bmod w_x)}{w_x} - 0.5 & (x(\bmod 2w_x) \leq w_x) \\ 0.5 - \dfrac{x0(\bmod w_x)}{w_x} - 0.5 & (x(\bmod 2w_x) > w_x) \end{cases} \qquad (4\text{-}5)$$

$$f_4(y0) = \begin{cases} w_y & (y0(\bmod w_y) \leq 0.5 \times w_y) \\ -w_y & (y0(\bmod w_y) > 0.5 \times w_y) \end{cases} \qquad (4\text{-}6)$$

where
$w_x$=fixWidthX×picture width
$w_y$=fixWidthY×picture height
[] is the Gaussian symbol; and
wherein said address signal generating step generates, by the equation (4-7):

$$X = X0 + cx$$

$$Y = Y0 + cy \qquad (4\text{-}7)$$

said address signal generating step also generating a readout signal (X,Y) in case the position of the point of origin in the rectangular coordinate system of said picture signals is (cx,cy).

* * * * *